US012703033B1

(12) United States Patent
Strivings

(10) Patent No.: US 12,703,033 B1
(45) Date of Patent: Aug. 11, 2026

(54) MODULAR, MULTIPURPOSE OUTFEED/ROUTER TABLE SAW SYSTEM

(71) Applicant: Evan Christopher Strivings, Duarte, CA (US)

(72) Inventor: Evan Christopher Strivings, Duarte, CA (US)

( * ) Notice: Subject to any disclaimer, the term of this patent is extended or adjusted under 35 U.S.C. 154(b) by 0 days.

(21) Appl. No.: 19/444,620

(22) Filed: Jan. 9, 2026

Related U.S. Application Data

(63) Continuation-in-part of application No. 18/984,736, filed on Dec. 17, 2024, now Pat. No. 12,533,739.

(60) Provisional application No. 63/687,642, filed on Aug. 27, 2024.

(51) Int. Cl.
*B23D 47/02* (2006.01)
*B23D 45/06* (2006.01)

(52) U.S. Cl.
CPC ........... *B23D 47/025* (2013.01); *B23D 45/06* (2013.01); *Y10T 83/773* (2015.04); *Y10T 83/95* (2015.04)

(58) Field of Classification Search
CPC .. B23D 47/025; B23D 57/0092; B23D 45/06; B25H 1/04; B25H 1/00; B25H 1/02; Y10T 83/773; Y10T 83/8763; Y10T 83/95; B23Q 1/72; B62B 5/0003; A47B 9/18; A47B 2009/185
USPC .......... 144/286.1, 287, 286.5; 83/477.2, 859, 83/574; 108/48, 59, 77, 65, 69, 152, 97; 280/47.18
See application file for complete search history.

(56) References Cited

U.S. PATENT DOCUMENTS 3,931,751 A * 1/1976 Simonson .......... B23D 57/0092 83/477.2
4,393,969 A * 7/1983 Woell ..................... B65G 13/11 193/35 TE
4,934,423 A * 6/1990 Withrow .................. B23Q 1/74 144/287
4,955,941 A * 9/1990 Rousseau ................. B23Q 1/74 108/65
5,819,671 A * 10/1998 Ocampo .............. B23D 47/025 108/65
6,047,750 A * 4/2000 Jensen ..................... B25H 1/04 144/287
6,182,935 B1 * 2/2001 Talesky ................ B23D 47/025 108/118
6,360,797 B1 * 3/2002 Brazell ................ B23D 47/025 144/286.5
6,439,280 B1 * 8/2002 Wang ................... B23D 47/025 144/287
6,546,978 B2 * 4/2003 Thoman .................... B27B 5/10 144/286.5

(Continued)

FOREIGN PATENT DOCUMENTS

CH 721517 A2 * 7/2025 ............... B27B 5/29

*Primary Examiner* — Laura M Lee
(74) *Attorney, Agent, or Firm* — Plager Schack LLP; Mark H. Plager; Naomi Mann

(57) ABSTRACT

A table saw attachment system for attaching a table saw to an accessory table provides height adjustment of the accessory table to correspond to the height of the table via first and second leg assemblies, having varying heights. The system further provides multiple connection methods for coupling the accessory table to the table saw, and for connecting accessory tables to one another for different configurations, based on the safety and workflow needs of the user.

20 Claims, 11 Drawing Sheets

(56) References Cited

U.S. PATENT DOCUMENTS

| | | | | |
|---|---|---|---|---|
| 6,883,881 | B2 * | 4/2005 | Gauss | A47F 9/00 108/65 |
| 7,331,596 | B2 * | 2/2008 | Tiramani | B25H 1/12 280/30 |
| 7,647,956 | B1 * | 1/2010 | Cona | B25H 1/12 144/286.5 |
| 9,403,224 | B1 * | 8/2016 | Silva | B23D 45/024 |
| 10,421,183 | B2 * | 9/2019 | Firth | B25H 1/10 |
| 11,027,411 | B2 * | 6/2021 | Van Bergen | B23D 47/025 |
| 12,520,935 | B2 * | 1/2026 | Wickramasekera | A47B 23/001 |
| 2011/0232805 | A1 * | 9/2011 | DeSpain | B25H 1/14 144/285 |
| 2019/0270146 | A1 * | 9/2019 | Gass | B23D 47/025 |

* cited by examiner 46
32
32
44
48
74
32
42
44
44

46
32
48
42

46
32
48
44
32
42
44

12A
12A
12A
28
12A
50
54
24
12A,B
12A,B
12A
24
12A,B
20
12A
24
26
24
12A,B
12A
10
34
12A
40
70

40
12A
20
12A,B
26
12A
28
24
60
10
54
50
70

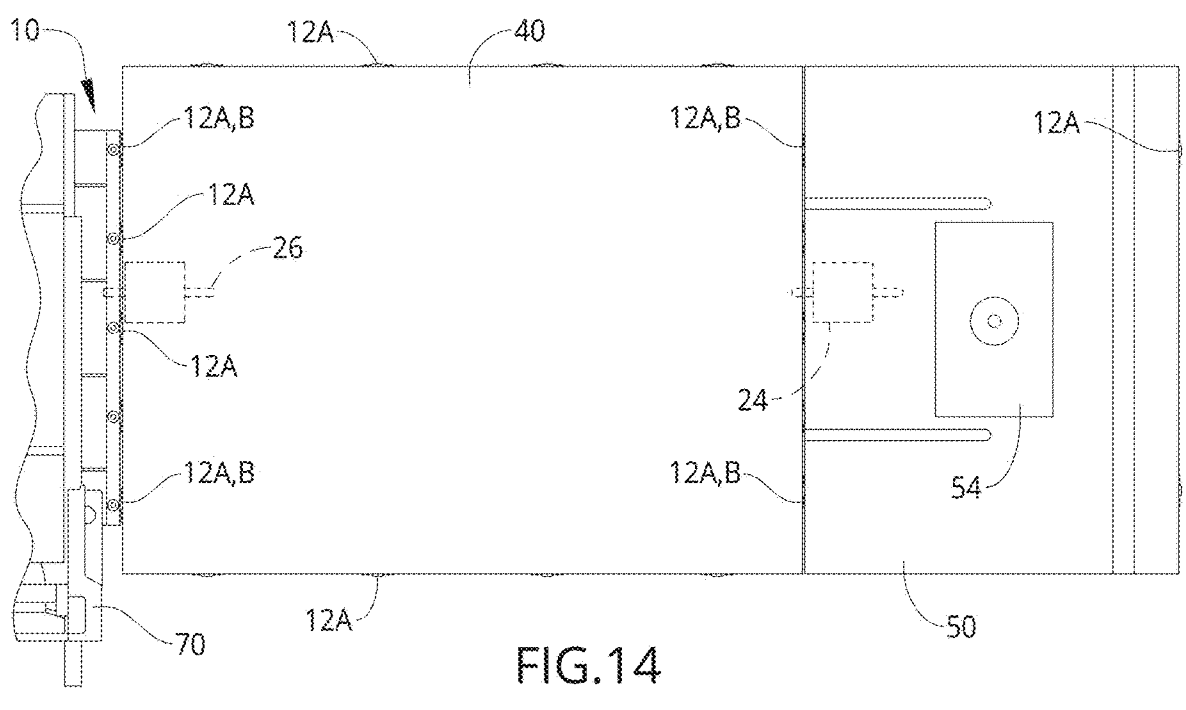
FIG.14
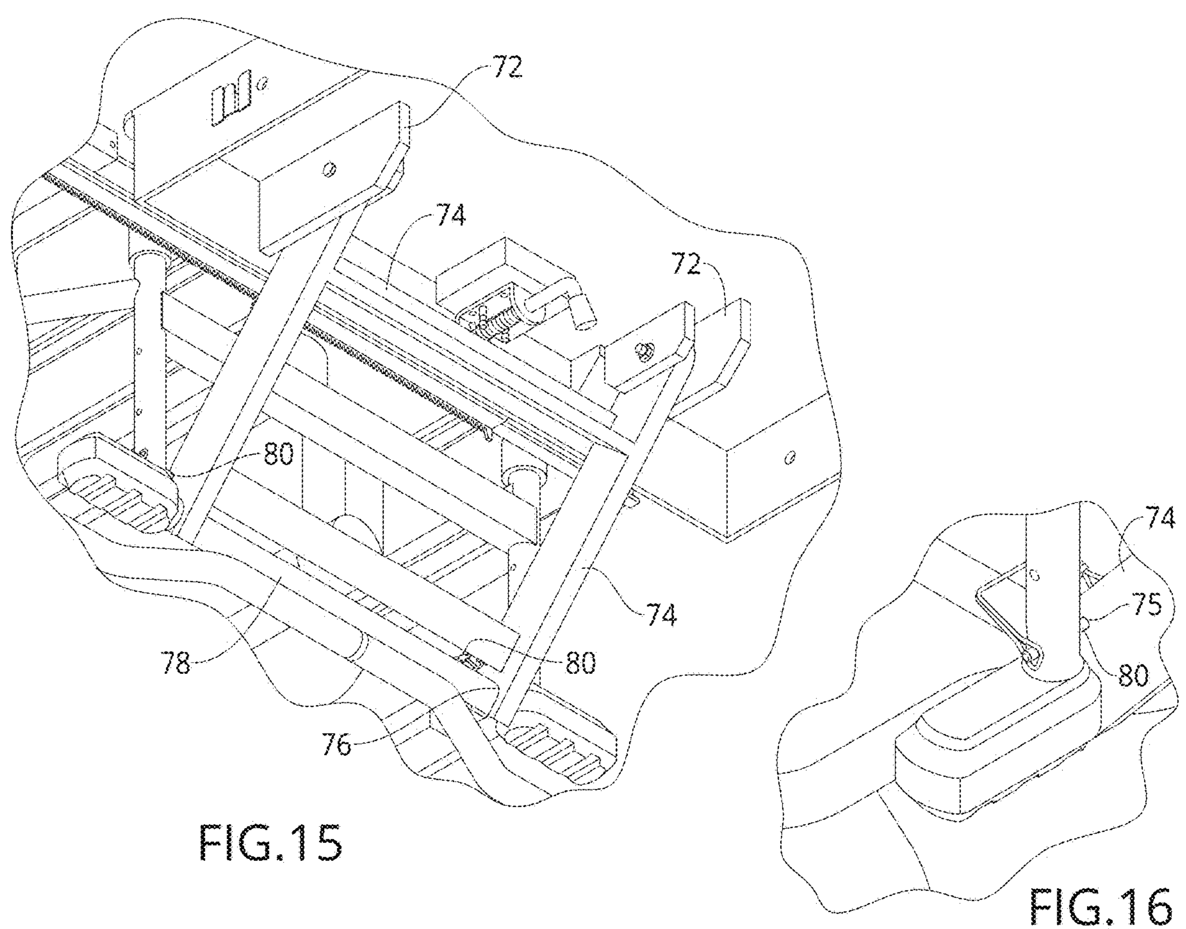
FIG.15
FIG.16

MODULAR, MULTIPURPOSE OUTFEED/ROUTER TABLE SAW SYSTEM

RELATED APPLICATION

This application is a CIP of U.S. application Ser. No. 18/984,736 filed Dec. 17, 2024, which claims benefit to Provisional Application No. 63/687,642 filed Aug. 27, 2024, all of which are incorporated by reference herein in their entirety.

BACKGROUND

The present disclosure relates generally to portable table saw systems and accessories.

Portable table saws, including jobsite and benchtop saws, are widely used due to their compact size and transportability. To increase functionality, such saws may be used with accessory tables, including outfeed tables and router tables, to form a temporary or semi-permanent workstation. These accessory tables may be positioned adjacent to or behind the portable table saw and can be configured to support workpieces as they exit the saw blade, maintain boards and panels in a substantially flat and level orientation during cutting operations, improve accuracy and user safety when processing long or wide materials, and/or enhance overall stability of the saw during operation. In many applications, proper use requires the accessory table surface to be aligned substantially flush with, or slightly below, the working surface of the portable table saw.

However, conventional accessory table solutions for portable table saws often suffer from drawbacks related to instability, limited adaptability, misalignment, reduced accuracy, inconsistent support during cutting or routing operations, as well as user frustration and safety concerns. Accordingly, an improved portable table saw system that addresses these issues is desirable.

SUMMARY

According to certain embodiments, disclosed is a table saw system and/or method, which may comprise adjusting the height of at least one accessory table to correspond to the height of the table saw via a dual leg assembly. The system further provides multiple connection methods for coupling the accessory table to the table saw, and for connecting accessory tables to one another. As is known, the table saw comprises a working surface supported on a table saw support frame that is optionally coupleable to a saw stand. Coupling the table saw support frame to the saw stand elevates the table saw from a ground-supported operational height to an elevated operational height. The accessory table may be, for example, a router table or an outfeed table, and includes an accessory tabletop defining a working surface.

In certain embodiments, the accessory table includes both a first folding leg assembly rotationally coupled to an underside of the accessory tabletop, and a second folding leg assembly rotationally coupled to the underside of the accessory tabletop. The first folding leg assembly and the second folding leg assembly each include table support legs having different lengths, wherein both the first folding leg assembly and the second folding leg assembly are configured to move between a folded position and a deployed position with respect to the accessory tabletop, and independently of one another. Deploying the first folding leg assembly is configured to position the accessory table at a height corresponding to the ground-supported height of the table saw, and deploying the second folding leg assembly is configured to position the accessory table at a height corresponding to the elevated height of the table saw, wherein adjusting the height of the accessory table comprises selecting one of the first folding leg assembly or the second folding leg assembly for deployment based on the operational height of the table saw, wherein the other leg assembly is placed in the folded position.

In some embodiments, the table saw is a portable table saw. In certain embodiments, the method further comprises attaching the accessory table to the table saw such that the table saw and the deployed leg assembly cooperatively function to support the accessory tabletop in a leveled orientation.

In some embodiments, the accessory table comprises a front attachment arm configured to connectively engage an elongated horizontal bar or other component of the table saw support frame for attaching the accessory table to the table saw. In some embodiments, a first end of the front attachment arm is rotationally coupled to the underside of the accessory tabletop and a second end of the front attachment arm includes an attachment member configured to secure to the elongated horizontal bar by a snap fit engagement, the attachment arm being selectively movable between a folded position for storage and a deployed position for attachment to the table saw.

In certain embodiments, the accessory table is further configured to attach to the table saw via an L-bracket, the L-bracket being removably attachable to the table saw support frame and supports connection elements for attachment to the accessory table, wherein the L-bracket and the front attachment arm provide alternative methods of attaching the accessory table to the table saw. In some embodiments, a front side surface of the accessory tabletop includes connection elements configured to mate with the connection elements in the L-backet. In some embodiments, the connection elements in the L-bracket and the connection elements in the front side surface of the accessory tabletop are flush mount brackets.

In certain embodiments, the method further comprises attaching a second accessory table to the accessory table attached to the table saw (also referred to as "first accessory table"). In some embodiments, attaching the second accessory table to the first accessory table comprise engaging connection elements provided in a front side surface of the accessory tabletop of the second accessory table to mating connection elements provided in a side surface of the accessory tabletop of the first accessory table. In some further embodiments, the connection elements in the first accessory table and the connection elements in the second accessory table comprise flush mount brackets.

In some embodiments, attaching the second accessory table to the first accessory table comprises engaging a bolt member of a latch assembly through aligned bolt receiving holes in the side surfaces of the first accessory table and the second accessory table, the latch assembly being provided at the underside of at least one of the accessory tabletops of the first accessory table and the second accessory table, wherein the bolt member is configured to translate between an extended position for engagement through the aligned bolt receiving holes and a retracted position.

In certain embodiments, attaching the first accessory table to the table saw comprises utilizing an attachment method selected from the following: a) using a front attachment arm provided in the first accessory table to connectively engage an elongated bar or other component of the table saw support frame; and b) attaching an L-bracket to the table saw support frame and connecting the first accessory table to the L-backet via mating connection elements in the L-bracket and a side surface of the accessory tabletop of the first accessory table. In some embodiments, the mating connection elements in the L-bracket and a side surface of the accessory tabletop comprise flush mount brackets. In some embodiments, connecting the first accessory table to the L-backet further comprises engaging a bolt member of a latch assembly provided at the underside of the accessory tabletop through a bolt receiving hole in the L-bracket. In certain embodiments, connecting the first accessory table to the L-backet further comprises engaging attachment screws through threaded inserts formed in an upper region of the L-bracket corresponding top screw holes provided in the first accessory table. In some embodiments, a first end of the front attachment arm is rotationally coupled to the underside of the first accessory tabletop and a second end of the front attachment arm includes an attachment member configured to secure to an elongated horizontal bar of the support frame by a snap fit engagement, the attachment arm being selectively movable between a folded position for storage and a deployed position for attachment to the table saw.

BRIEF DESCRIPTION OF THE FIGURES

The detailed description of some embodiments of the invention will be made below with reference to the accompanying figures, wherein the figures disclose one or more embodiments of the present invention.

FIG. 14 is a top view of yet another arrangement of the table saw system.

FIG. 15 is a bottom perspective view of the table saw system, illustrating an alternate connection via a front attachment arm.

FIG. 16 is a detailed view of a pin for the a front attachment arm.

DETAILED DESCRIPTION OF CERTAIN EMBODIMENTS

Figure 1:
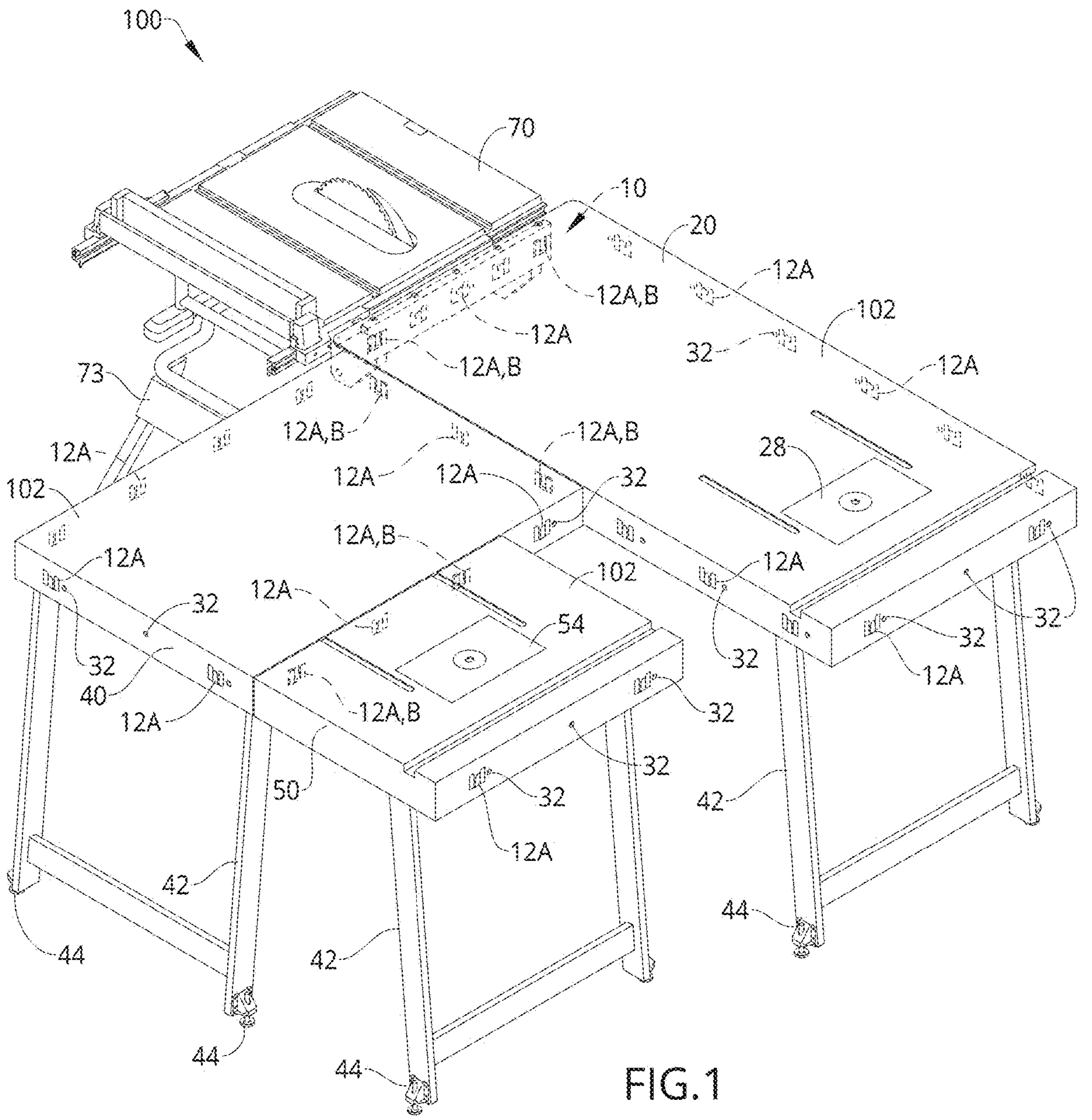
FIG. 1 is a perspective view of a modular, multipurpose outfeed/router table saw system, according to various embodiments.
Figure 2:
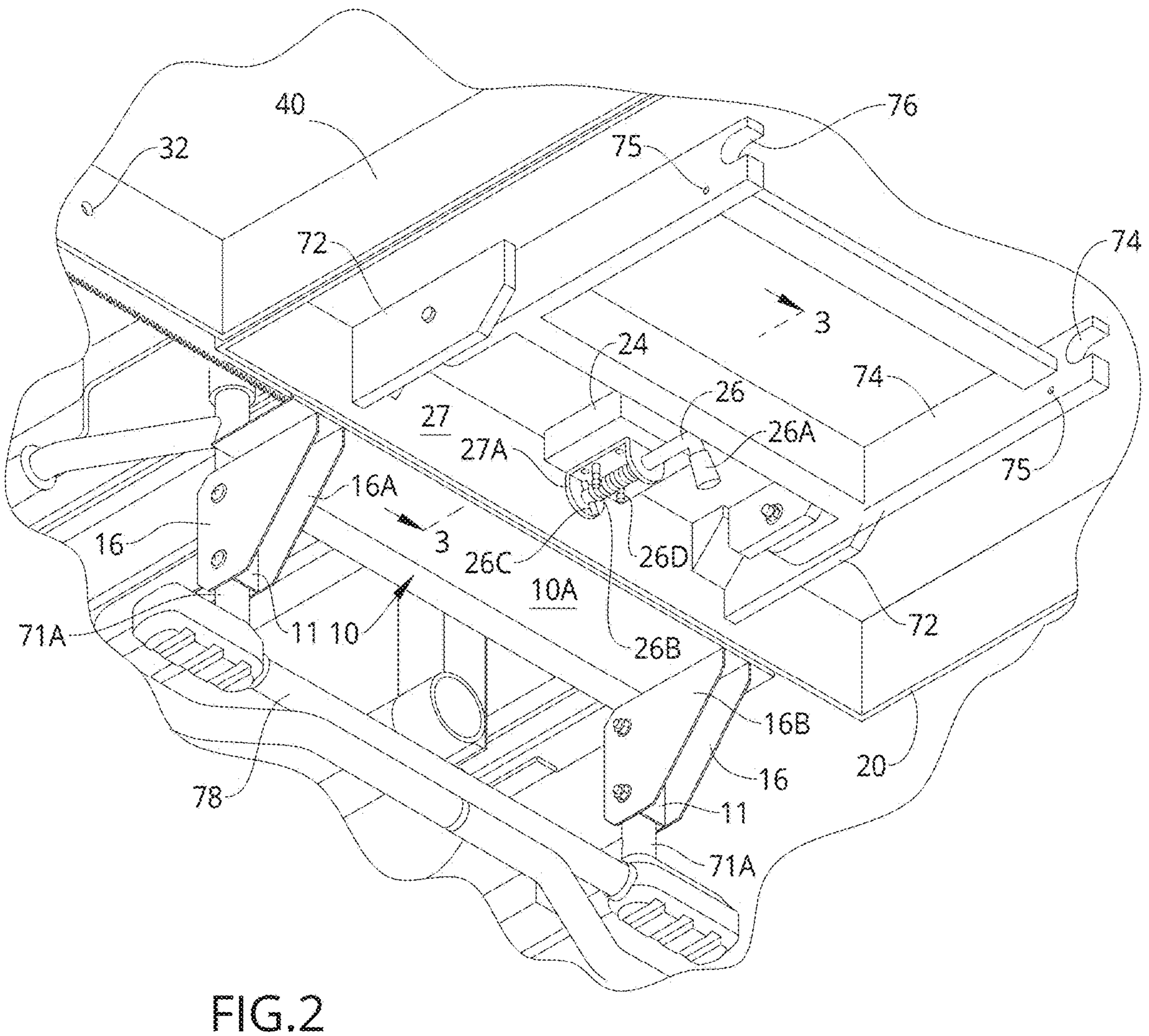
FIG. 2 is a bottom perspective detailed view of an attachment point of a table and bracket of the table saw system of FIG. 1.
Figure 3:
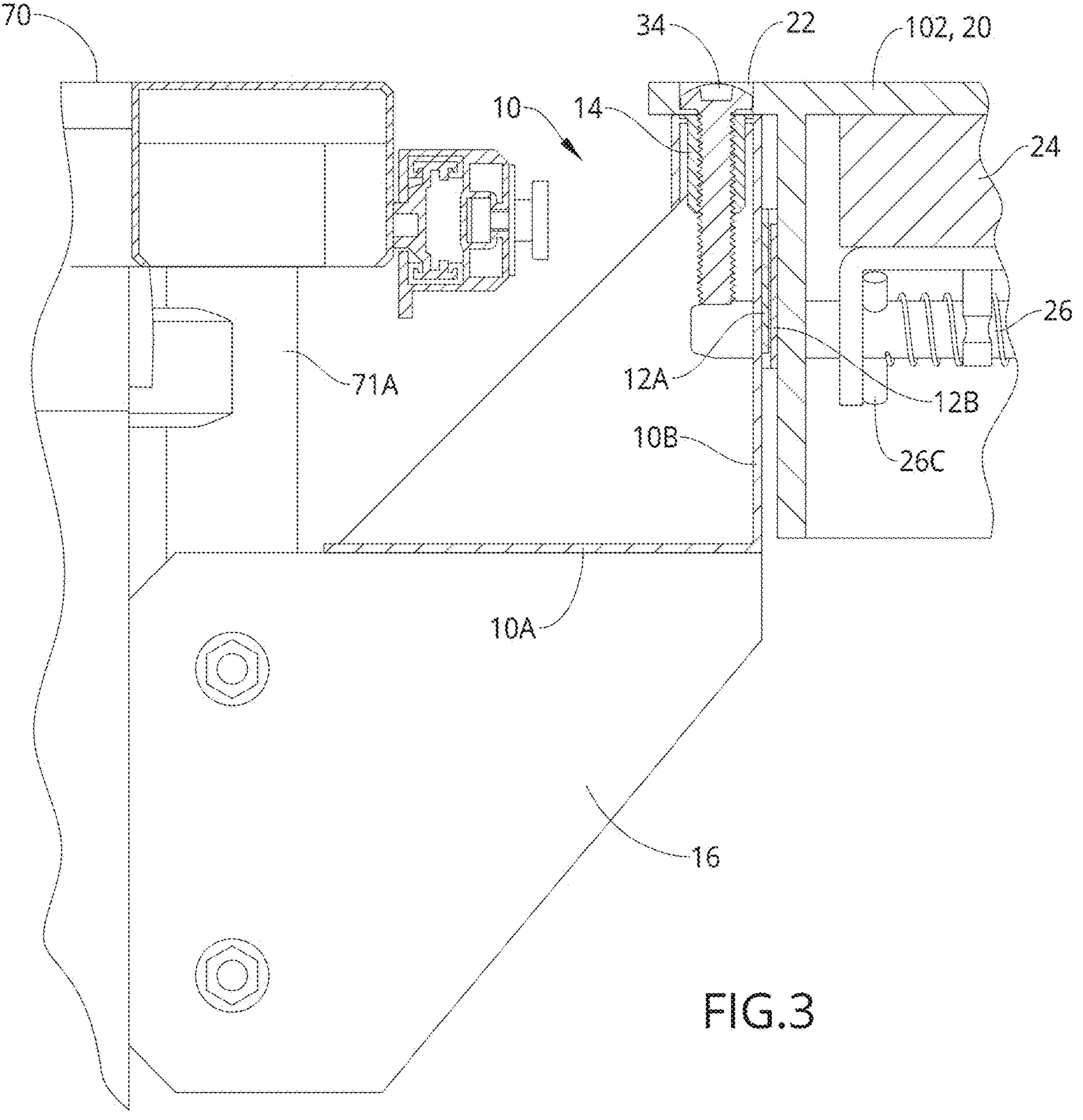
FIG. 3 is a section view along line 3-3 in FIG. 2.
Figure 4:
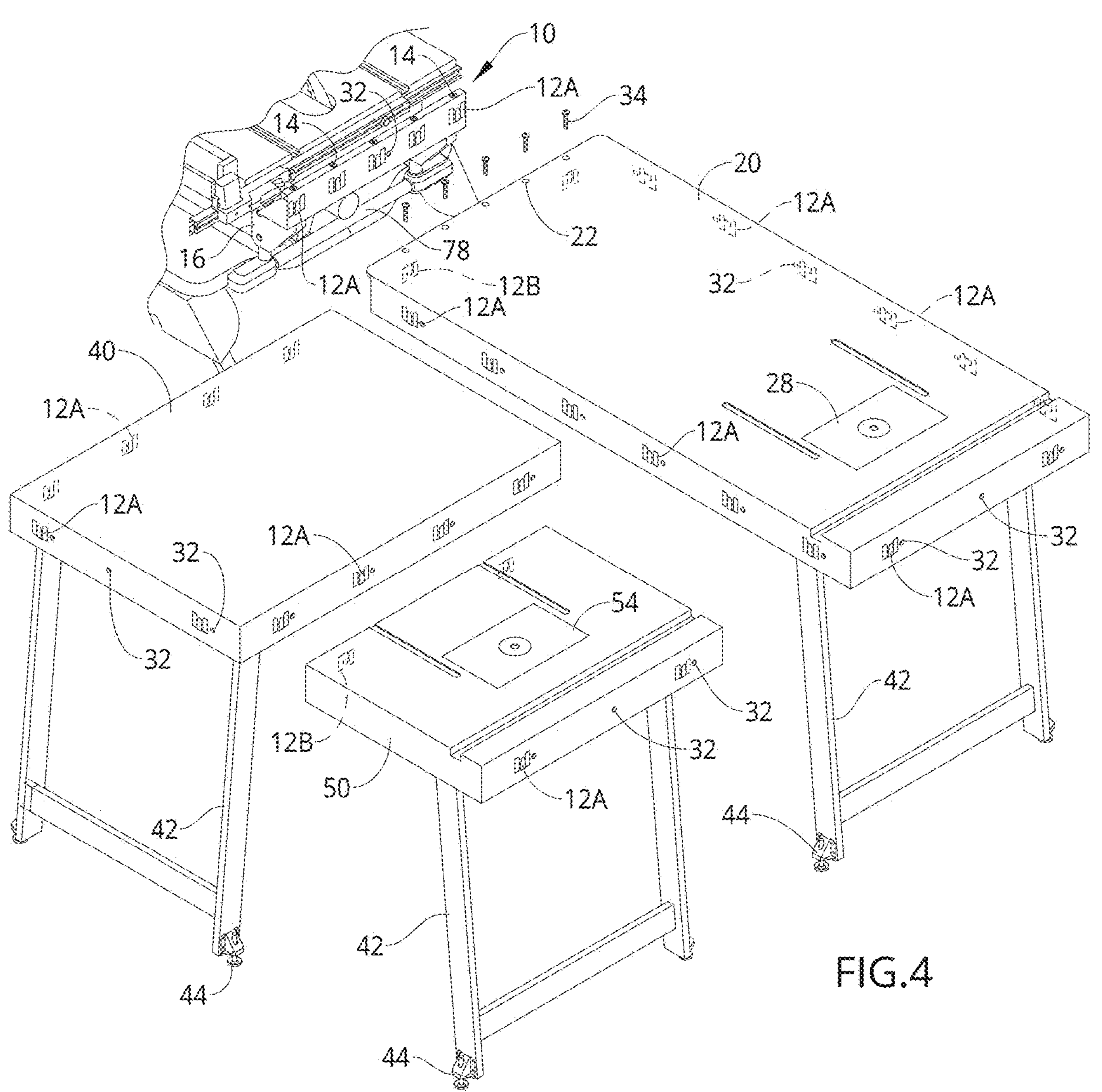
FIG. 4 is an exploded view of an exemplary arrangement of the table saw system.
Figure 5:
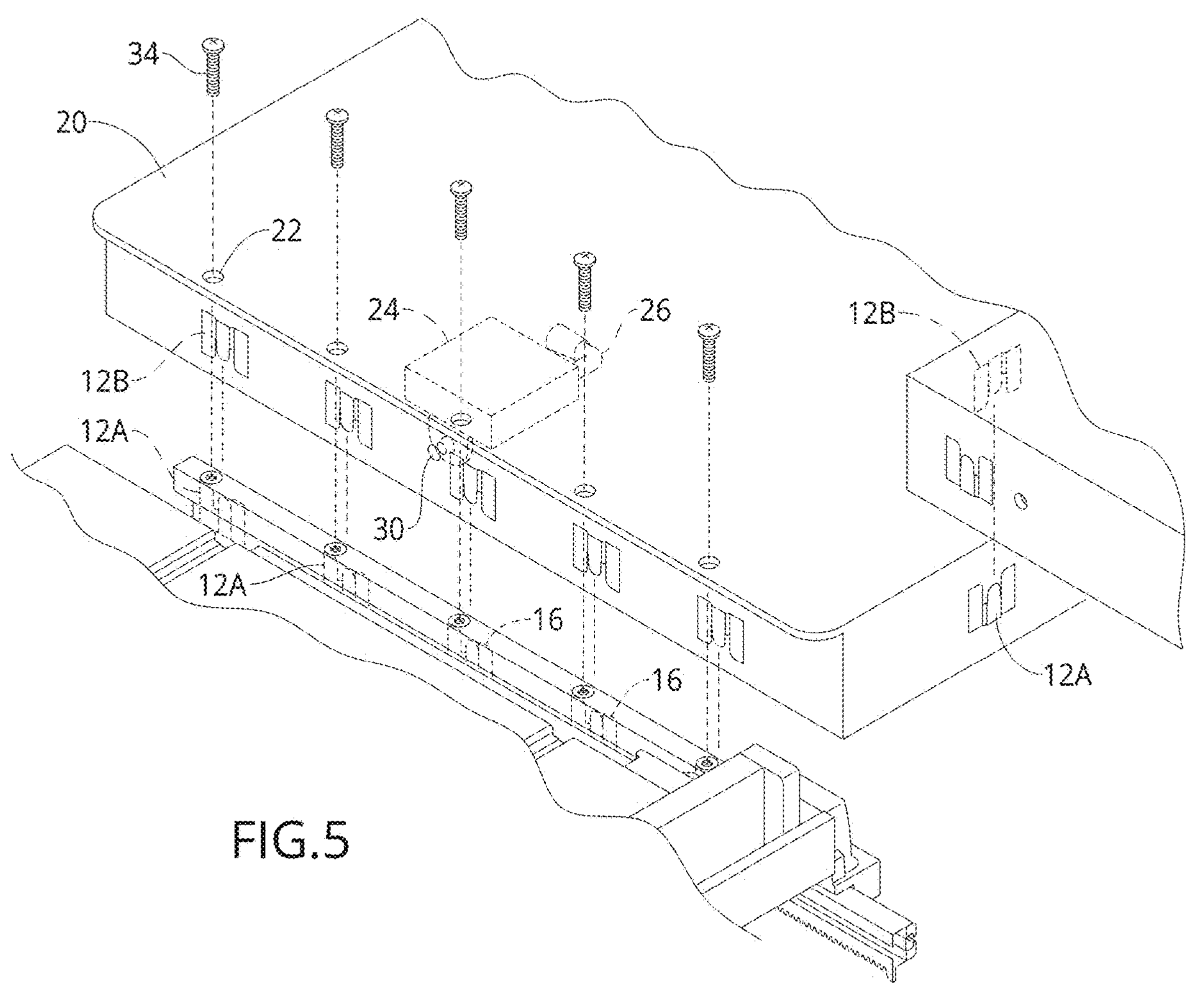
FIG. 5 is a rear perspective exploded view of the table saw system, depicting various attachment mechanisms of the system.
Figures 6, 7, 8:
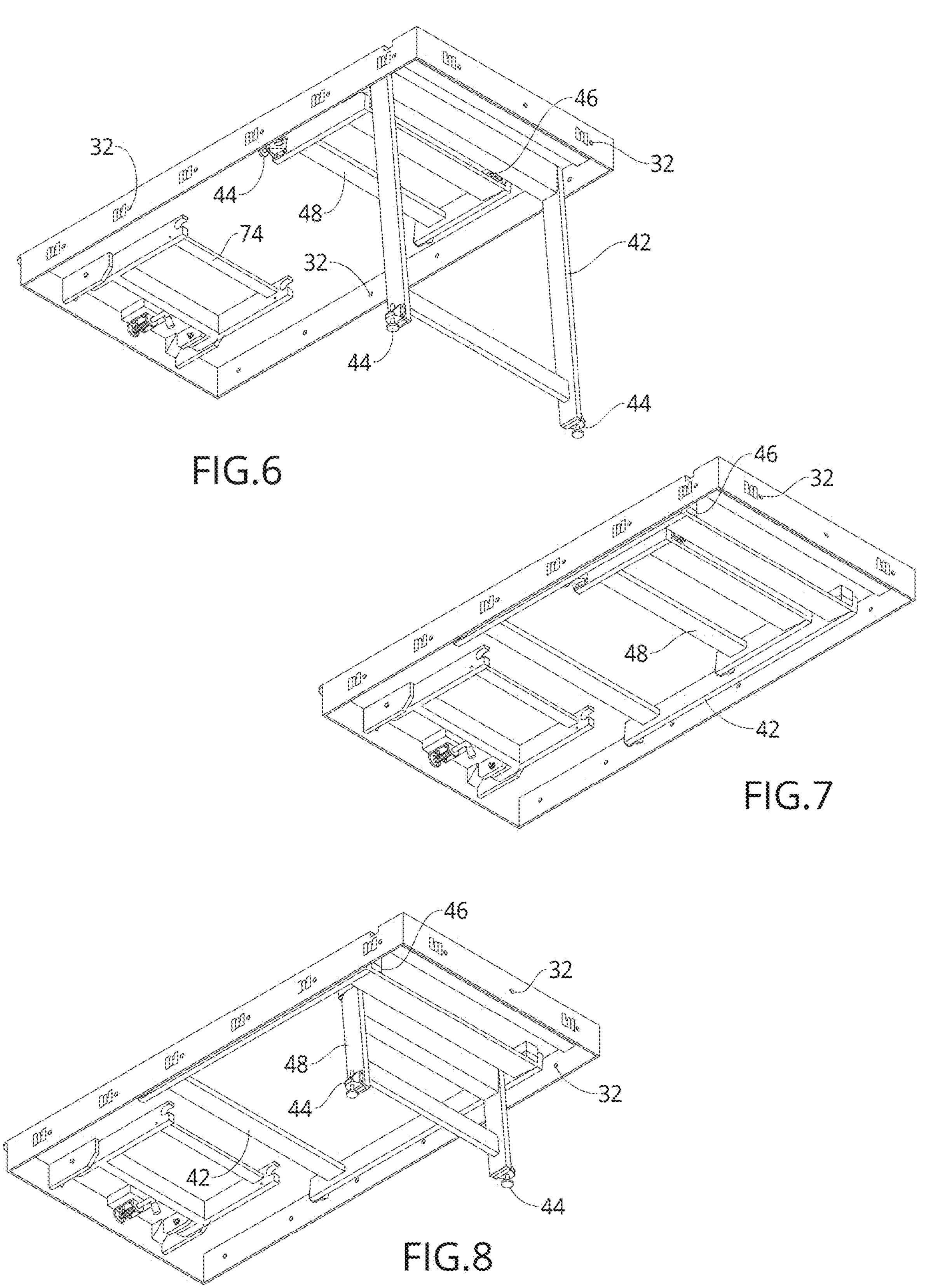
FIG. 6 is a bottom perspective view of an accessory table of the table saw system, with a long leg assembly in a deployed position.
FIG. 7 is a bottom perspective view of the accessory table of FIG. 6, with all leg assemblies in folded position.
FIG. 8 is a bottom perspective view of the accessory table of FIG. 6, wherein a short leg assembly of the table is in the deployed position instead of the long leg assembly.
Figure 9:
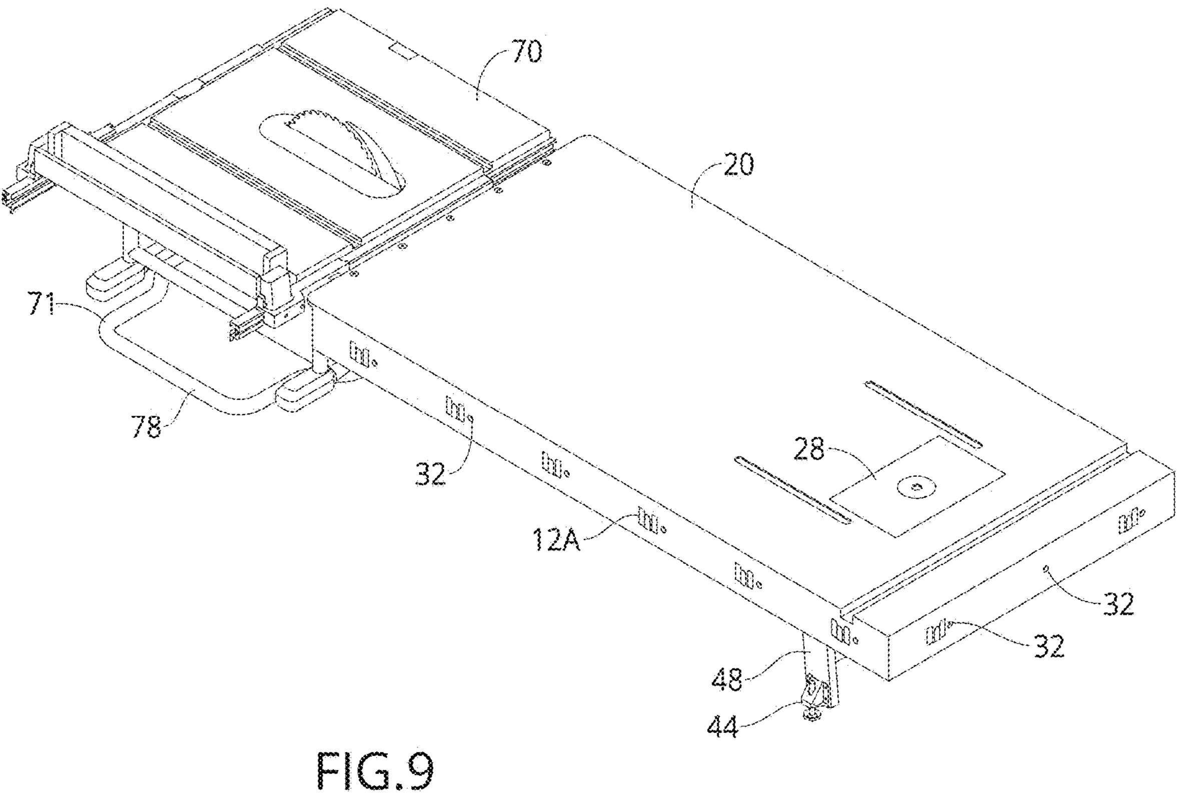
FIG. 9 is a perspective view showing use of the short leg assembly.
Figure 10:
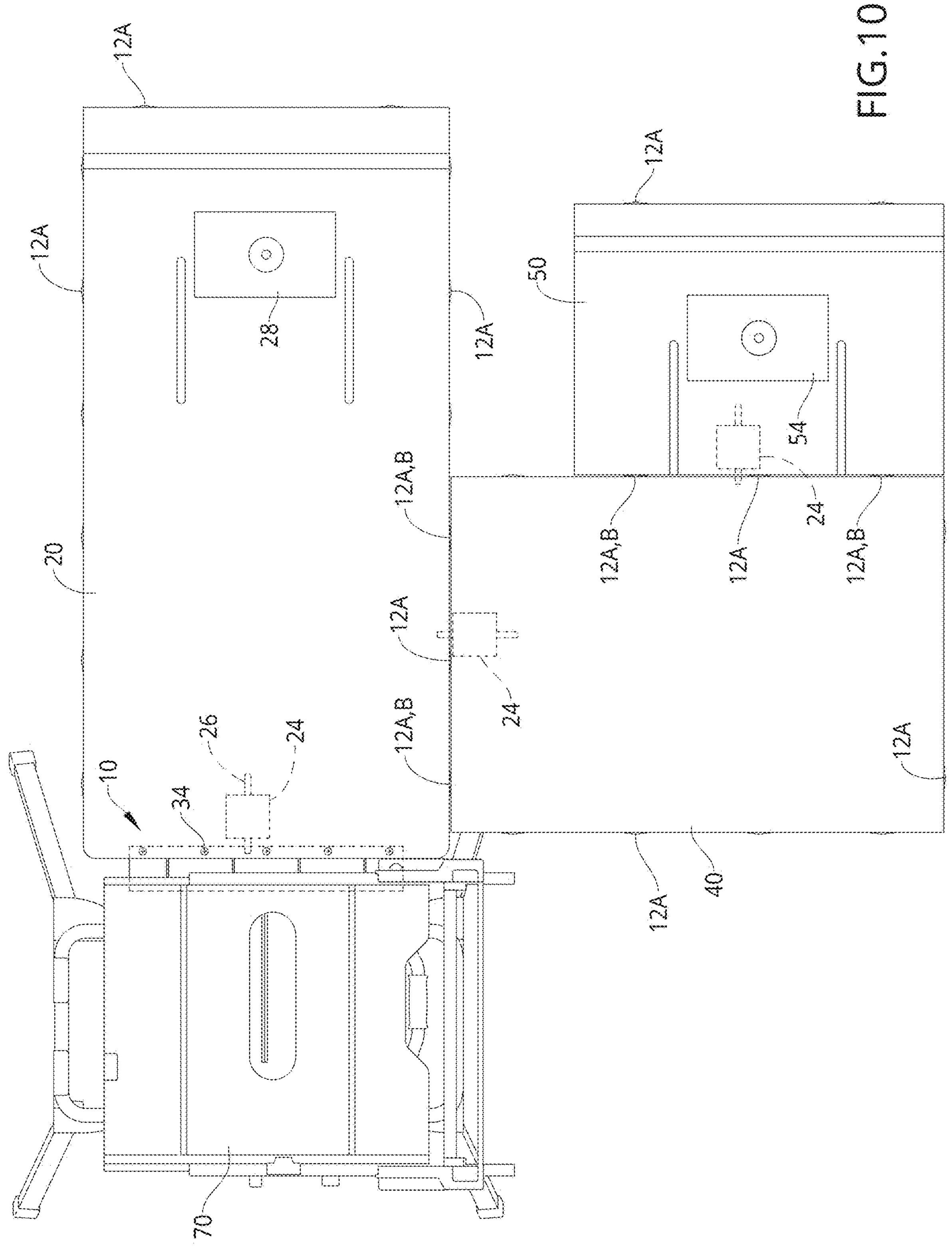
FIG. 10 is a top view of an exemplary arrangement of the table saw system.
Figure 11:
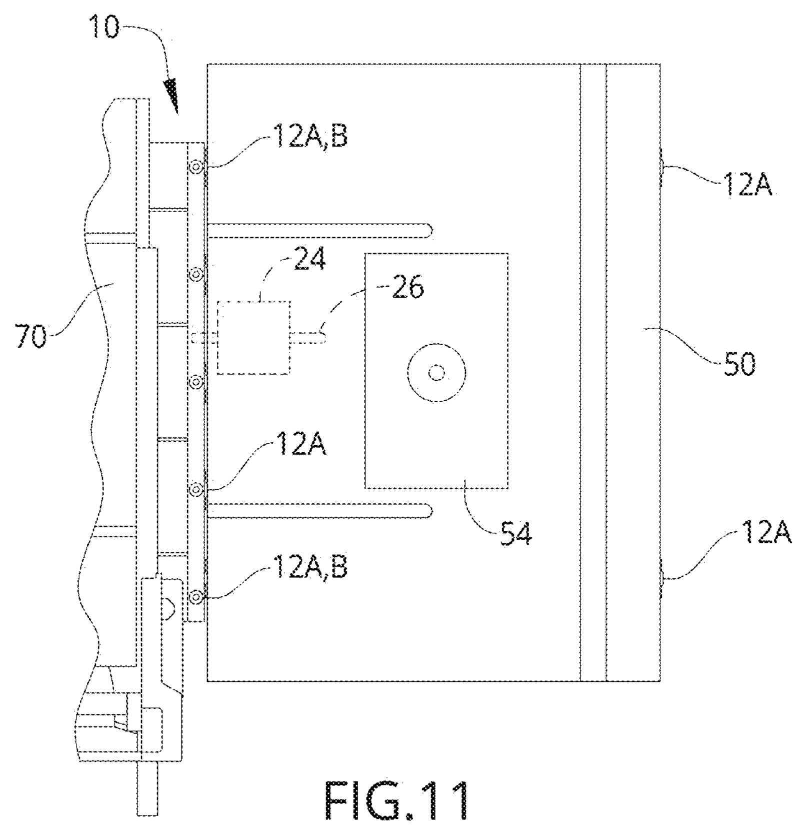
FIG. 11 is a top view showing connection of an alternate router table accessory table to the table saw.
Figure 12:
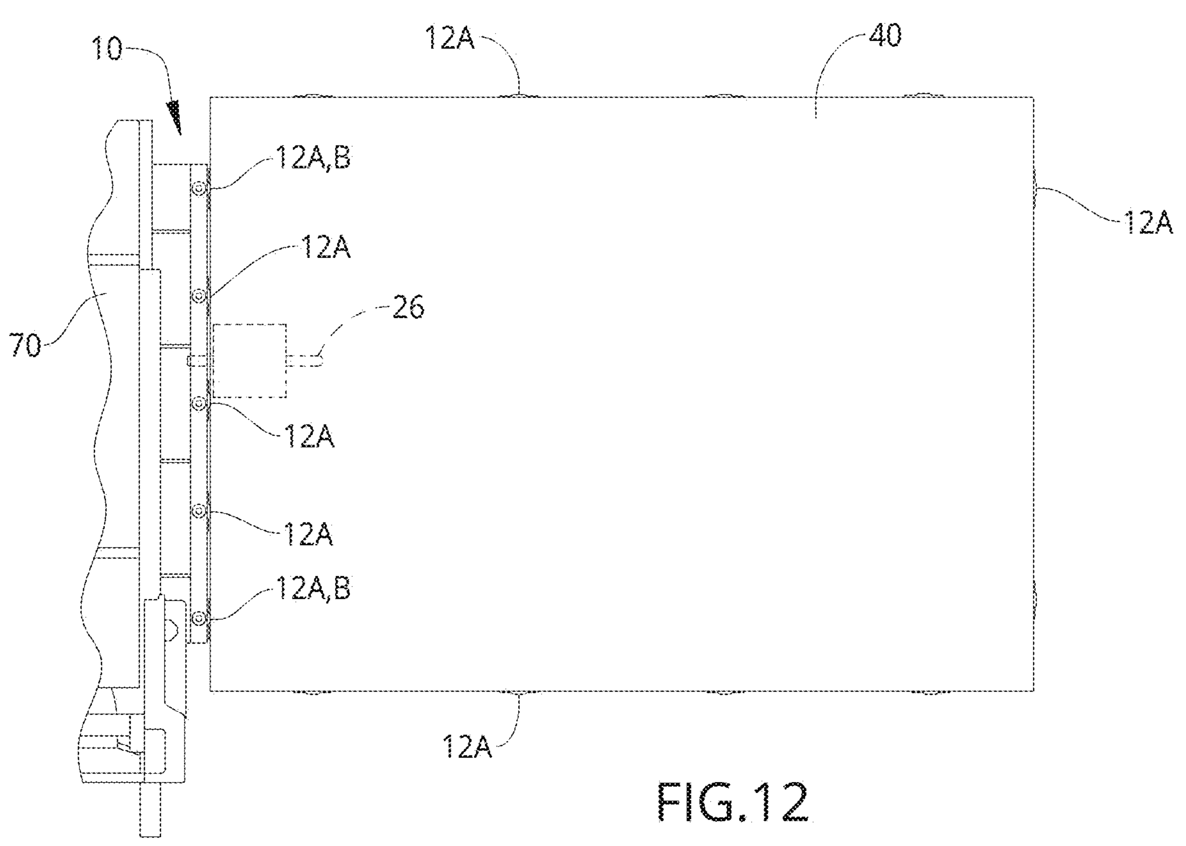
FIG. 12 is a top view showing connection of a different alternate accessory table to the table saw.
Figure 13:
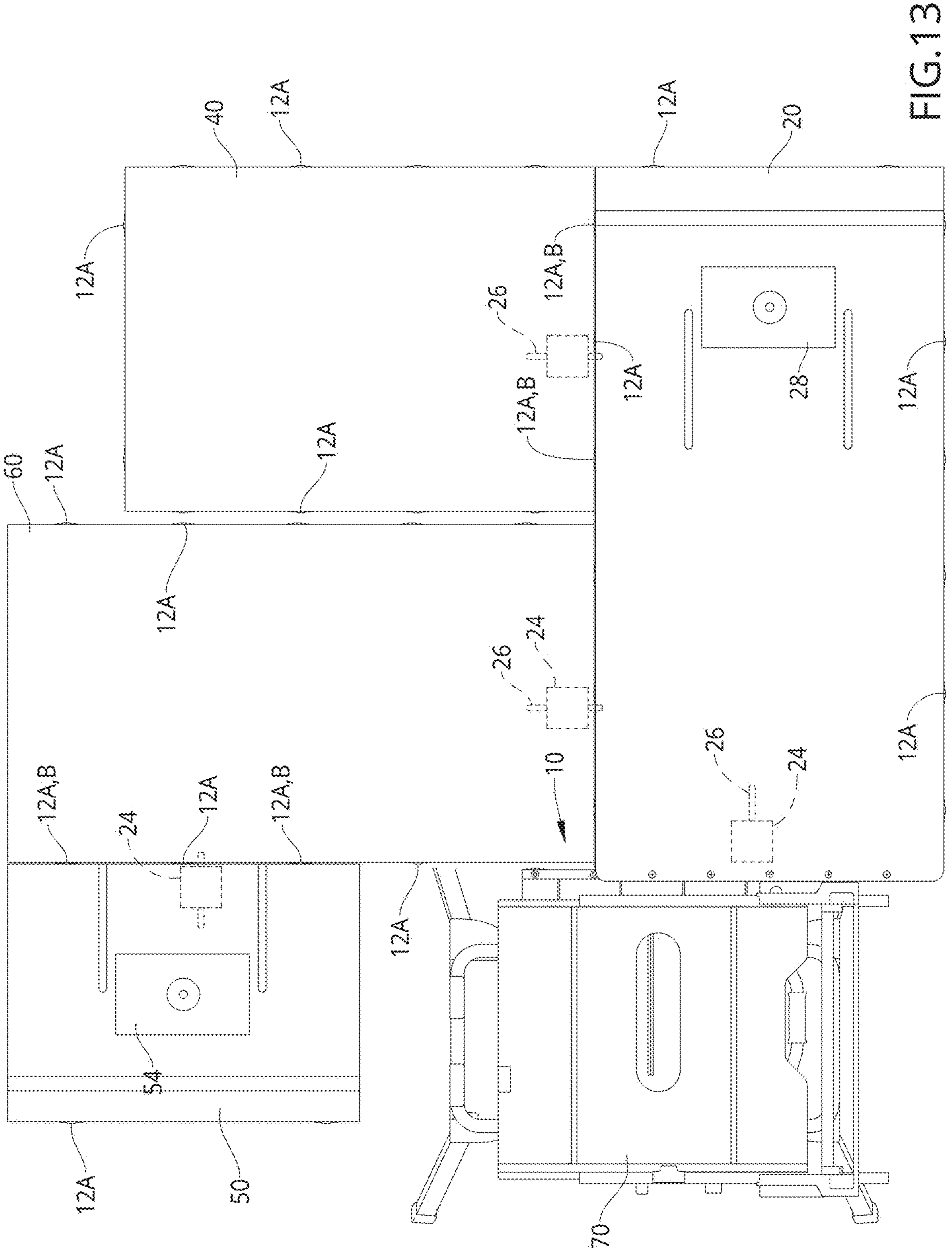
FIG. 13 is a top view of yet another alternate arrangement of the table saw system, wherein a spring bolt of an accessory table connected to the table saw is shown retracted.

According to various embodiments as depicted in FIGS. 1-16, disclosed is a modular, multipurpose outfeed/router table saw system 100 for attachment of accessory tables 102 to a portable table saw 70. In embodiments, the table saw system 100 provides various interlocking/attachment members and height adjustment legs that enable the table saw system 100 to be arranged in various configurations and with different accessory tables 102 assembled to the table saw 70 and/or to one another. Such accessory components may comprise, for example, a primary outfeed/router table 20 including router plate 28, a side outfeed table 40, a compact router table 50 including router plate 54, and a long outfeed table 60. The ability to selectively attach one or more accessory tables 102 to the portable table saw 70 enables the use of tools such as a router or spindle sander and additional outfeed surface length for a multipurpose and versatile outfeed table workstation.

In certain embodiments, a first attachment mechanism comprises a front attachment arm 74 configured to engage the table saw support frame 71, such as an elongated horizontal bar 78 of the frame 71. Attachment arm 74 generally provides a folding arm operatively coupled to an underside of the accessory tabletop by a hinged connection assembly 72, and may include an attachment feature 76 configured to secure to the elongated horizontal bar 78 by a snap fit engagement. The attachment feature, may include, for example, one or more notches, recesses, or receiving formations formed proximate the end of the attachment arm, which are sized and shaped to engage a corresponding portion of the horizontal bar 78. In some embodiments, the attachment feature 76 may be configured to produce an audible, tactile, and/or mechanical indication of securement, also referred to as a “click.” It shall be appreciated that in alternate embodiments, attachment arm 74 may be configured to secure to other components, including vertical bars of the support frame 71. Additionally, different attachment mechanisms may be used in alternate embodiments.

In some embodiments, hinged connection assembly 72 is configured to permit selective movement of the attachment arm 74 between a deployed position and a folded storage position. In the deployed position, attachment arm 74 may be rotated frontwards of the tabletop of the accessory table, such that the attachment end of the arm, including connection notches 76, positions frontwards of the tabletops front edge in position for engagement with the bar 78 of the table saw support frame 71. In some embodiments, the hinged connection assembly 72 may include fixed brackets secured to the underside of the accessory tabletop, that pivotally support the attachment arm 74 and define a rotational axis at which the attachment arm may swing between the deployed and stored positions. In some embodiments, a lock mechanism provided on the underside of the tabletop may secure the leg in the stored position, allowing its release using normal hand force. The lock such may comprise, for example, a clamp providing a receiving lock channel, magnets, a recessed channel formed on the underside of the tabletop, and the like. In further embodiments, attachment arm 74 may also include a lock mechanism that secures the arm in the deployed position, when engaged to the bar 78. In one embodiment, this may comprise pinholes 75 that may be provided proximate the connection notches 76, and are configured to align with pinholes provided within the table saw support frame 71, such that a nut and bolt or a clevis pin 80 may be inserted through the aligned holes to securely hold the attachment arm 74 in place. As such, front attachment arm 74 enables any accessory table 102 to be secured to table saw 70.

In further embodiments, a second attachment mechanism comprises an L-bracket 10 that is removably attachable to the table saw support frame 71 and supports connection elements for attachment to accessory table 102. The L-bracket 10 is further configured to capture material or debris that falls from a rear side of the table saw 70 during cutting or sawing operations, thereby preventing such material from falling to the ground. This reduces clutter in the work area and lowers the risk of injury. The L-bracket 10 may generally comprise a main horizontal plate 10A and a main vertical plate 10B. The horizontal plate 10A supports bottom connection plates 16 that are configured to attach to vertical columns 71A of the table saw support frame 71, which extend below the tabletop of the table saw. The vertical plate 10B extends upwardly from a rear edge of the horizontal plate 10A and is oriented substantially perpendicular thereto. Additionally, in certain embodiments, the L-bracket 10 may include structural reinforcement elements, such as triangular ribs, extending between the main horizontal plate 10A and the main vertical plate 10B to enhance rigidity.

In certain embodiments, the bottom connection plates 16 are coupled to a bottom surface of the horizontal plate 10A and are configured to position the L-bracket 10 adjacent a rear side of the table saw 70, with the horizontal plate 10A disposed between and below the tabletops of the table saw and the accessory table. In this configuration, the horizontal plate 10A defines a platform configured to capture material falling between the adjacent tabletops. The bottom connection plates 16 are spaced apart to receive and capture corresponding vertical columns 71A of the table saw support frame 71. The bottom connection plates 16 may be bonded to an underside of the main horizontal plate 10A, for example by welding, bolting, or other fastening methods, or may be formed as an integral extension of the horizontal plate 10A. In some embodiments, the bottom connection plates 16 include a first pair of vertical bottom connection plates 16A with an intermediate spacer 11 extending therebetween, and a second pair of vertical bottom connection plates 16B with a corresponding intermediate spacer 11 extending therebetween. The first pair of bottom connection plates 16A and associated spacer 11 are positioned proximate a first end of the L-bracket 10 and define a forward-facing slot configured to receive a first vertical column 71A of the table saw support frame. The second pair of bottom connection plates 16B and associated spacer 11 are positioned proximate a second end of the L-bracket 10 and similarly define a forward-facing slot configured to receive a second vertical column 71A of the table saw support frame. The bottom connection plates 16 may further include apertures configured to align with corresponding apertures formed in the vertical columns 71A, such that the L-bracket 10 may be secured to the table saw 70 using threaded fasteners extending through the aligned apertures and retained with nuts, washers, or similar fastening elements. In certain embodiments, the spacers 11 are positioned substantially in alignment with a front edge of the main horizontal plate 10A. It shall be appreciated that the dimensions, spacing, and geometries of the bottom connection plates 16 and spacers 11, as well as their relative positioning, may vary in alternate embodiments. It shall further be appreciated that alternative attachment mechanisms for coupling the L-bracket 10 to the table saw 70 may be employed without departing from the scope of the disclosure.

The L-bracket 10 includes one or more accessory table connection elements for coupling the L-bracket 10 to the accessory table 102. In some embodiments, the accessory table connection elements include a first set of interlocking members 12A provided along a rear surface of the vertical plate 10B and configured to mate with a second set of interlocking members 12B provided on a front-side surface of the accessory table 102. In certain embodiments, the interlocking members comprise flush-mount brackets oriented in opposite directions, such that an upward-oriented flush-mount bracket on one surface engages a downward-oriented flush-mount bracket on the opposing surface. In further embodiments, flush mount brackets 12A and/or 12B further allow different accessory tables 102 to be connect to one another. As such, each accessory table 102 in table saw system 100 may be connected to the table saw 70, and/or to another accessory table using the flush mount brackets 12A and 12B. In certain embodiments, flush mount bracket may be provided around at least a portion of the side surfaces of at least one, and preferably multiple accessory tables 102 of table saw system 100. This provides users with multiple options for connection of any one of the accessory tables to the L-bracket 10 attached to table saw 70 and for connection of the accessory tables to one another. At least one, and preferably at least 2 flush mount brackets may be provided at a respective side surface of the one or more accessory tables 102.

In some embodiments, additional accessory table connection elements in L-bracket 10 may be provided to reinforce the attachment of the accessory table 102 to the L-bracket 10/table saw 70. In one embodiment, such reinforcement connection elements may include threaded inserts 14 formed in an upper region of the L-bracket 10 and configured to receive attachment screws 34 extending through corresponding top screw holes 22 in accessory table 102.

In another embodiment, a spring-biased latch assembly 26 may be provided at the underside of the tabletop of one or more accessory table 102 of table saw system 100. In one embodiment, the spring-biased latch assembly 26 is coupled to a block 24 via a retaining bracket 27A. The block 24 is attached to the underside of the tabletop proximate a tabletop edge to place latch assembly 26 rearwards of a side surface 27 extending downwards from said tabletop edge.

In certain embodiments, the latch assembly 26 includes a bolt member 26A operatively coupled to a spring 26B. The bolt member 26A is configured to translate relative to the retaining bracket 27A between an extended position and a retracted position, whereby the spring 26B is configured to apply a force to the bolt member 26A to urge the bolt member toward the extended position. The retaining bracket 27A is affixed to block 24 and includes front and back end plates comprising holes through which bolt member 26A passes, the spring 26B being captured between the plates.

In the extended position, spring 26B is forced through a bolt latch hole 30 provided in side surface 27. A bolt receiver hole 32 may further be provided in a side surface of another accessory table 102 and/or in the main vertical plate 10B of the L-bracket 10. As such, a first accessory table of table saw system 100 having latch assembly 26 may be placed adjacent a second component of the table saw system 100 having a bolt receiver hole 32 with the bolt latch hole 30 of the first accessory table and the bolt receiver hole 32 of the second component aligned. The bolt member 26A may then be released to lockably engage the second component to the first accessory table. The second component may be another accessory table or saw table 70 with the L-bracket 10 attached thereto (see FIG. 3).

In some embodiments, the latch assembly 26 includes a spring-retaining mechanism configured to selectively hold the bolt member 26A in a retracted position until release is desired. In one example, as depicted in the figures, the retaining mechanism comprises a retaining pin 26C coupled to the bolt member 26A proximate a forward end thereof, and one or more pin-engagement members 26D coupled to an underside of the retaining bracket 27A. When the bolt member 26A is retracted such that the retaining pin 26C is positioned rearward of the pin-engagement members 26D, the bolt member 26A may be rotated to bring the retaining pin 26C into engagement with the pin-engagement members 26D. In this engaged condition, the bolt member 26A is retained in the retracted position and prevented from being urged forward by the biasing force of the spring 26B. Upon subsequent rotation of the bolt member 26A to disengage the retaining pin 26C from the pin-engagement members 26D, the spring 26B forces the bolt member 26A toward its extended position.

In some embodiments, the latch assembly 26 may be used as a secondary or reinforcing connection after components have been initially connected using flush-mount brackets 12A/12B and/or attachment screws 34. In certain embodiments, the flush-mount brackets are configured to position the connected components in proper alignment relative to one another, thereby facilitating subsequent securement using the latch assembly 26 and/or the attachment screws 34. In other words, an initial attachment between any two components of the system 100 using the flush-mount brackets positions a bolt receiver hole 32 formed in a first component in alignment with a bolt latch hole 30 formed in a second component, assuming the bolt receiver hole 32 and the bolt latch hole 30 are present in the respective components. The initial attachment further positions threaded inserts 14 provided in one of the components in alignment with corresponding top screw holes 22 formed in the other component, again assuming the threaded inserts 14 and top screw holes 22 are present in the connected components.

According to an exemplary embodiment, all accessory tables 102 of the table saw system 100 are provided with flush-mount brackets 12A/12B and at least one of a latch assembly 26 and/or a bolt receiver hole 32, thereby allowing convenient connection of any two accessory tables to one another using a dual connection mechanisms. Additionally, the L-bracket 10 includes flush-mount brackets 12A/12B and at least one of a bolt receiver hole 32 and threaded inserts 14, and in some embodiments includes all three connection mechanisms. In one embodiment, at least one accessory table, e.g., the primary outfeed/router table 20, is provided with top screw holes 22 and a latch assembly 26, such that a three-level connection between the primary outfeed/router table 20 and the table saw 70 can be made using the L-bracket 10 (see FIGS. 1-5). Alternatively, a direct connection can be made by coupling the front attachment arm 74 of the accessory table to the table saw support frame 71 of table saw 70.

In further embodiments, one or more accessory tables 102 are provided with a foldable long leg assembly 42 and a foldable short leg assembly 48, which can be selectively deployed for alternate height setup of the accessory table. The leg assemblies 42, 48 are positioned at a rear section of the accessory tabletop, and are each configured to support the tabletop when connected at its front end to the table saw 70 or to another accessory table of table saw system. The short leg assembly 48 is sized to allow the table saw 70 to be used at ground level, and the long leg assembly 42 allows the table saw to be elevated wherein the support frame 71 of the table saw may be supported atop a saw stand 73. When one leg assembly is deployed, the other leg assembly may be folded under the tabletop. In some embodiments, each leg assembly 42, 48, may generally comprise a supportively leg member operatively coupled to a hinge 46 affixed to the underside of the tabletop. In some embodiments, a retaining members may optionally be provided for holding each leg assembly in the deployed and folded positions. Additionally, leg assemblies 42, 46, as well as attachment arm 74 are configured to fold under the tabletop of the accessory table simultaneously. In some further embodiments, the legs of assemblies 42 and 48 may each be provided with a pair of leveling feet 44 that are incrementally height adjustable via a threaded mechanism. In some alternate embodiments, additional leg assemblies may be provided at the front end of the accessory table to allow the table to be self-supporting.

Hence, table saw system 100 provides multiple attachment methods, including a dual height leg system and dual table saw frame attachment system for coupling an accessory table to a table saw, and for connecting accessory tables to one another for different configurations that address the workflow needs of the user. The connection methods, including reinforcement options, enhance safety and stability. The system may be used with commercially available accessory tables, such as router tables 20, 50, outfeed tables 40, 60, and the like, wherein the accessory table may be manufactured or retrofitted with the attachment components of the system suitable for a particular table saw model (which may be a commercially available table saw, or a table saw manufactured specifically for the disclosed system). Additionally, as components of the system are foldable or detachable, the system enables easy and convenient storage, transport, and deployment.

It shall be appreciated that the disclosed system and/or components of the disclosed system may have different configurations in alternate embodiments. The disclosed system may also be adapted for different applications in alternate embodiments, such as non-portable table saw systems, other types of workbenches, power tool platforms and components, modular furniture/table extension systems, etc. It shall be appreciated that components of table saw system 100 may comprise any alternative known materials in the field and be of any size and/or dimensions. It shall be appreciated that the components of table saw system 100 may be manufactured and assembled using any known techniques in the field.

It shall be understood that the orientation or positional relationship indicated by terms such as “upper”, “lower”, “front”, “rear”, “left”, “right”, “top”, “bottom”, “inside”, “outside” is based on the orientation or positional relationship shown in the accompanying drawings, which is only for convenience and simplification of describing the disclosed subject matter, rather than indicating or implying that the indicated device or element must have a specific orientation or are constructed and operated in a specific orientation, and therefore should not be construed as a limitation of the present invention.

As used herein, the articles “a” and “an” are intended to include one or more items, and may be used interchangeably with “one or more.” Where only one item is intended, the term “one” or similar language is used. Also, as used herein, the terms “has”, “have”, “having”, “with” or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A table saw method, comprising:

placing a first accessory table of a table saw system adjacent to a table saw, and adjusting the height of the first accessory table to correspond to the height of the table saw, the table saw comprising a working surface supported on a table saw support frame that is optionally coupleable to a saw stand, wherein coupling the table saw support frame to the saw stand elevates the table saw from a ground-supported operational height to an elevated operational height, wherein the first accessory table includes an accessory tabletop defining a working surface, a first folding leg assembly rotationally coupled to an underside of the accessory tabletop, and a second folding leg assembly rotationally coupled to the underside of the accessory tabletop, wherein the first folding leg assembly and the second folding leg assembly each include table support legs having different lengths, wherein both the first folding leg assembly and the second folding leg assembly are configured to move between a folded position and a deployed position with respect to the accessory tabletop, and independently of one another, wherein deploying the first folding leg assembly is configured to position the first accessory table at a height corresponding to the ground-supported height of the table saw, wherein deploying the second folding leg assembly is configured to position the first accessory table at a height corresponding to the elevated height of the table saw, and wherein adjusting the height of the first accessory table comprises selecting one of the first folding leg assembly or the second folding leg assembly for deployment based on the operational height of the table saw.

2. The table saw method of claim 1, wherein the table saw is a portable table saw.

3. The table saw method of claim 2, further comprising attaching the first accessory table to the table saw such that the table saw and the deployed leg assembly cooperatively function to support the accessory tabletop in a leveled orientation.

4. The table saw method of claim 3, wherein the first accessory table comprises a front attachment arm configured to connectively engage the table saw support frame for attaching the first accessory table to the table saw.

5. The table saw method of claim 4, wherein a first end of the front attachment arm is rotationally coupled to the underside of the accessory tabletop and a second end of the front attachment arm includes an attachment member configured to secure to an elongated horizontal bar of the table saw support frame by a snap fit engagement, the front attachment arm being selectively movable between a folded position for storage and a deployed position for attachment to the table saw.

6. The table saw method of claim 5, wherein the first accessory table is further configured to attach to the table saw via an L-bracket, the L-bracket being removably attachable to the table saw support frame and supports connection elements for attachment to the first accessory table, wherein the L-bracket and the front attachment arm provide alternative methods of attaching the first accessory table to the table saw.

7. The table saw method of claim 6, wherein a front side surface of the accessory tabletop includes connection elements configured to mate with the connection elements in the L-backet.

8. The table saw method of claim 7, wherein the connection elements in the L-bracket and the connection elements in the front side surface of the accessory tabletop are flush mount brackets.

9. The table saw method of claim 3, further comprising attaching a second accessory table to the first accessory table.

10. The table saw method of claim 9, wherein attaching the second accessory table to the first accessory table comprise engaging connection elements provided in a side surface of the accessory tabletop of the first accessory table to mating connection elements provided in a side surface of the accessory tabletop of the second accessory table.

11. The table saw method of claim 10, wherein the connection elements in the first accessory table and the connection elements in the second accessory table comprise flush mount brackets.

12. The table saw method of claim 10, wherein attaching the second accessory table to the first accessory table comprises engaging a bolt member of a latch assembly through aligned bolt receiving holes in the side surfaces of the first accessory table and the second accessory table, the latch assembly provided at the underside of at least one of the accessory tabletops of the first accessory table and the second accessory table, wherein the bolt member is configured to translate between an extended position for engagement through the aligned bolt receiving holes and a retracted position.

13. The table saw method of claim 3, wherein attaching the first accessory table to the table saw comprises utilizing an attachment method selected from the following:

a) using a front attachment arm provided in the first accessory table to connectively engage the table saw support frame; and b) attaching an L-bracket to the table saw support frame and connecting the first accessory table to the L-backet via mating connection elements in the L-bracket and a side surface of the accessory tabletop of the first accessory table.

14. The table saw method of claim 13, wherein the mating connection elements in the L-bracket and a side surface of the accessory tabletop comprise flush mount brackets.

15. The table saw method of claim 13, wherein connecting the first accessory table to the L-bracket further comprises engaging a bolt member of a latch assembly provided at the underside of the accessory tabletop through a bolt receiving hole in the L-bracket.

16. The table saw method of claim 13, wherein connecting the first accessory table to the L-backet further comprises engaging attachment screws through threaded inserts formed in an upper region of the L-bracket corresponding top screw holes provided in the first accessory table.

17. The table saw method of claim 13, wherein a first end of the front attachment arm is rotationally coupled to the underside of the first accessory tabletop and a second end of the front attachment arm includes an attachment member configured to secure to an elongated horizontal bar of the table saw support frame by a snap fit engagement, the attachment arm being selectively movable between a folded position for storage and a deployed position for attachment to the table saw.

18. The table saw method of claim 13, further comprising attaching a second accessory table to the first accessory table.

19. The table saw method of claim 18, wherein attaching the second accessory table to the first accessory table comprise engaging connection elements provided in a side surface of the accessory tabletop of the first accessory table to mating connection elements provided in a side surface of the accessory tabletop of the second accessory table.

20. The table saw method of claim 19, wherein connection elements in the first accessory table and the connection elements in the second accessory table comprise flush mount brackets.

* * * * *